(12) United States Patent
Koizuka et al.

(10) Patent No.: US 8,202,004 B2
(45) Date of Patent: Jun. 19, 2012

(54) LOW-FRICTION SLIDE MEMBER, PRODUCTION APPARATUS THEREFOR AND PROCESS FOR PRODUCING THE SAME

(75) Inventors: Yousuke Koizuka, Yokohama (JP); Yoshiteru Yasuda, Yokohama (JP); Toshikazu Nanbu, Machida (JP); Tokio Sakane, Yokohama (JP); Yoshitaka Uehara, Yokohama (JP); Kazuhiko Takashima, Yokohama (JP); Minoru Ota, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 952 days.

(21) Appl. No.: 12/161,063

(22) PCT Filed: Dec. 27, 2006

(86) PCT No.: PCT/JP2006/326006
§ 371 (c)(1),
(2), (4) Date: Jul. 16, 2008

(87) PCT Pub. No.: WO2007/086227
PCT Pub. Date: Aug. 2, 2007

(65) Prior Publication Data
US 2010/0150482 A1 Jun. 17, 2010

(30) Foreign Application Priority Data

Jan. 24, 2006 (JP) .................................. 2006-015522
Aug. 31, 2006 (JP) .................................. 2006-236725

(51) Int. Cl.
*F16C 33/10* (2006.01)
*F16C 33/02* (2006.01)

(52) U.S. Cl. ......... 384/293; 384/276; 384/286; 384/291

(58) Field of Classification Search .................. 384/276, 384/283–284, 288, 291–293
See application file for complete search history.

(56) References Cited

U.S. PATENT DOCUMENTS

| 1,016,561 | A | * | 2/1912 | Grabler | 277/409 |
| 2,673,767 | A | * | 3/1954 | Schoeppner | 384/291 |
| 3,386,783 | A | * | 6/1968 | Scheufler | 384/291 |
| 4,987,865 | A | * | 1/1991 | Schenkel | 123/193.6 |
| 6,095,690 | A | * | 8/2000 | Niegel et al. | 384/293 |
| 6,491,438 | B1 | * | 12/2002 | Ono et al. | 384/288 |
| 6,565,258 | B1 | * | 5/2003 | Yamada et al. | 384/276 |
| 6,736,101 | B2 | | 5/2004 | Kano et al. | |
| 7,086,324 | B2 | * | 8/2006 | Buettner et al. | 92/129 |
| 7,287,459 | B2 | | 10/2007 | Tabata et al. | |
| 7,399,122 | B2 | * | 7/2008 | Fujita et al. | 384/276 |
| 7,458,585 | B2 | * | 12/2008 | Hamada et al. | 277/310 |
| 2005/0175263 | A1 | | 8/2005 | Nanbu et al. | |
| 2005/0245178 | A1 | | 11/2005 | Takashima et al. | |

FOREIGN PATENT DOCUMENTS

EP 1 092 885 A2 4/2001
(Continued)

*Primary Examiner* — Marcus Charles
(74) *Attorney, Agent, or Firm* — Foley & Lardner LLP (57) ABSTRACT

There is provided a low-friction sliding member having a sliding surface slidable relative to an opposing member via an oil, wherein the sliding surface has a plurality of texture groups, each of the texture groups consists of at least two adjacent fine recesses having portions aligned to each other in either a sliding direction or oil flow direction; a distance between the texture groups is larger than a distance between the adjacent recesses; and the texture groups is distributed uniformly over the sliding surface.

10 Claims, 12 Drawing Sheets

FOREIGN PATENT DOCUMENTS

| | | |
|---|---|---|
| JP | 61-268848 A | 11/1986 |
| JP | 7-133704 A | 5/1995 |
| JP | 2002-235852 A | 8/2002 |
| JP | 2003-35368 A | 2/2003 |
| JP | 2005-249194 A | 9/2005 |
| JP | 2005-320934 A | 11/2005 |
| JP | 2005-335055 A | 12/2005 |
| JP | 2006-17259 A | 1/2006 |
| JP | 2006-161563 A | 6/2006 |

\* cited by examiner

A : EXAMPLE 1
B : EXAMPLE 2
C : EXAMPLE 3
D : COMPARATIVE EXAMPLE 1
E : COMPARATIVE EXAMPLE 2

Prior Art Machining Technique

FIG.23A

Prior Art Machining Technique

FIG.23B

LOW-FRICTION SLIDE MEMBER, PRODUCTION APPARATUS THEREFOR AND PROCESS FOR PRODUCING THE SAME

CROSS-REFERENCE TO RELATED APPLICATIONS

This application is the U.S. National Phase of PCT/JP2006/326006, filed Dec. 27, 2006, which claims benefit of priority of Japanese Patent Application Nos. 2006-015522 and 2006-236725.

TECHNICAL FIELD

The present invention relates to a low-friction sliding member and a production apparatus and process therefor.

BACKGROUND OF THE INVENTION

As friction reduction technique for sliding members, it has been common practice to form fine depressions, recesses, grooves etc. in sliding surfaces of the sliding members. (See Patent Publication 1.) In the case where the recesses are formed in the sliding surface of the sliding member, however, the sliding member sustains a kinetic pressure effect during its sliding movement so as to exert a force that causes an increase in lubricant film thickness by the development of positive pressures on the rear sides of the recesses in the sliding direction but exert a force that causes a decrease in lubricant film thickness by the development of negative pressures on the front sides of the recesses in the sliding direction. This causes an increase in friction on the sliding member.
Patent Document 1: Japanese Laid-Open Patent Publication No. 2002-235852

SUMMARY OF THE INVENTION

The present invention has been made to solve the above prior art problem. It is an object of the present invention to provide a low-friction sliding member capable of obtaining a friction reduction effect efficiently. It is also an object of the present invention to provide an apparatus and method for producing the low-friction sliding member with a high degree of machining precision at a low cost in a short time.

According to a first aspect of the present invention, there is provided a low-friction sliding member comprising a sliding surface slidable relative to an opposing member via an oil, the sliding surface having a plurality of texture groups, each of which consisting of at least two adjacent fine recesses having portions aligned to each other in either a sliding direction or oil flow direction, a distance between the texture groups being larger than a distance between the adjacent recesses, the texture groups being distributed uniformly over the sliding surface.

According to a second aspect of the present invention, there is provided a low-friction sliding mechanism comprising a pair of sliding members having sliding surfaces slidable relative to each other via an oil, at least one of the sliding surfaces of the sliding members having a plurality of texture groups, each of which consisting of at least two adjacent fine recesses having portions aligned to each other in either a sliding direction or oil flow direction, a distance between the texture groups being larger than a distance between the adjacent recesses, the texture groups being distributed uniformly over the sliding surface.

According to a third aspect of the present invention, there is provided a production apparatus of a low-friction sliding member, the sliding member having a sliding surface formed with a plurality of texture groups, each of the texture groups consisting of at least two adjacent recesses, the production apparatus comprising: a workpiece holding unit that holds a cylindrical workpiece to be machined into the sliding member so as to allow rotation of the workpiece and positioning of the workpiece in a rotation direction; a cylindrical forming roller having an outer peripheral surface formed with a plurality of protrusions; a forming roller holding unit that holds the forming roller so as to allow rotation of the forming roller and relative axial movement of the forming roller and the workpiece; a load application unit that presses the forming roller against the workpiece at a predetermined load; a forming roller measurement unit that measures a rotational position of the forming roller; a forming roller drive unit that adjusts the rotational position of the forming roller by rotation of the forming roller; a forming roller positioning unit that stops the rotation of the forming roller and locks the forming roller in position; and a control unit that performs operation control of the rotational positions of the forming roller and the workpiece and the axial position of the forming roller in such a manner as to serially form the adjacent recesses of each texture group.

According to a fourth aspect of the present invention, there is provided a production process of a low friction sliding member having a plurality of texture groups of at least two adjacent recesses, the production process comprising: rotatably holding a cylindrical workpiece; rotatably holding a cylindrical forming roller having a plurality of protrusions on an outer peripheral surface thereof; and pressing the forming roller against an outer peripheral surface of the workpiece, wherein the adjacent recesses of each texture group are formed serially by the forming roller.

DETAILED DESCRIPTION

Exemplary embodiments of the present invention will be described below with reference to the drawings.

First, a low-friction sliding mechanism according to one embodiment of the present invention will be described below.

The low friction sliding mechanism of the present embodiment has multiple applications such as a cylinder-to-piston sliding part and a bearing part in an automotive engine and includes a pair of low-friction sliding members 1 having respective sliding surfaces 2 slidable relative to each other with a lubricating oil applied therebetween.

Figure 1A:
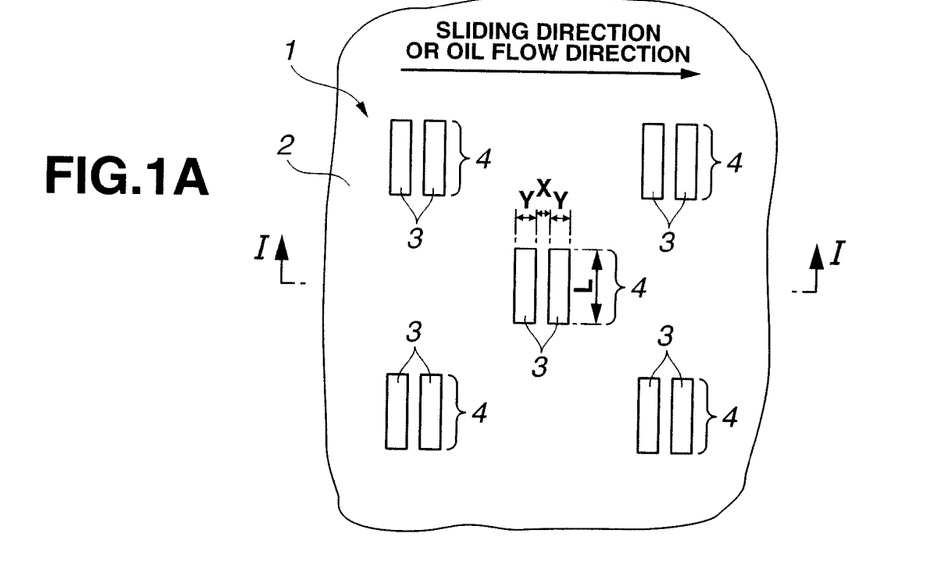
FIG. 1A is a plan view of surface part of a low-friction sliding member according to one embodiment of the present invention.
Figure 1B:
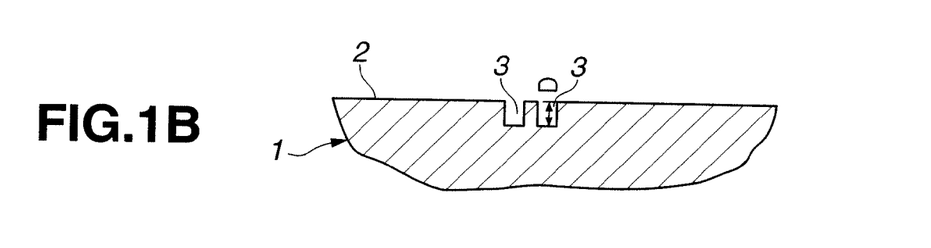
FIG. 1B is a section view of the low friction sliding member when taken along a line I-I of FIG. 1A.
Figure 8:
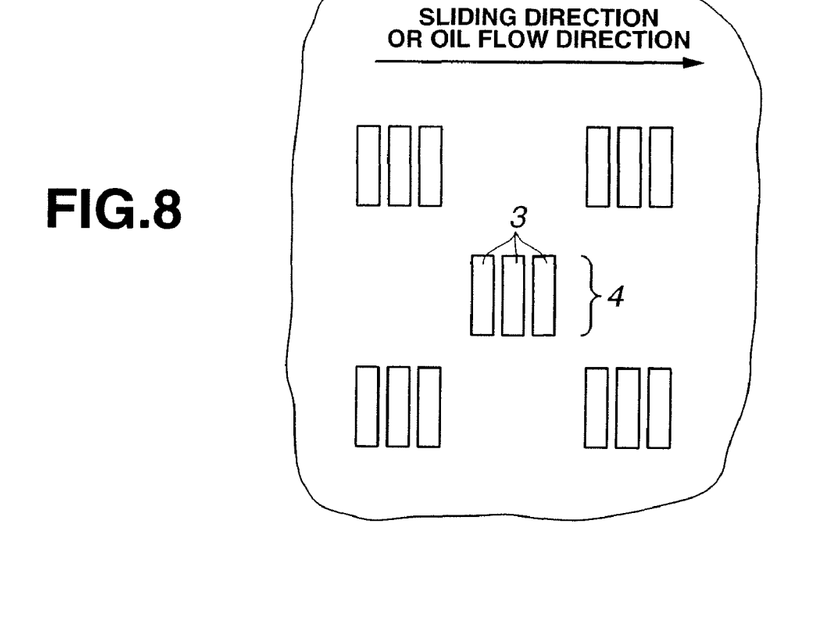
FIG. 8 is a plane view of surface part of a low friction sliding member according to another embodiment of the present invention.

At least one of the sliding surfaces 2 of the sliding members 1 has a plurality of texture groups 4, in each of which two fine recesses 2 are aligned adjacent to each other in a sliding direction (oil flow direction), as shown in FIGS. 1A and 1B. The sliding direction (oil flow direction) is herein indicated by an arrow in the drawing. Alternatively, two or more recesses 2, for example, three recesses 3 may be provided in a row in one texture group 4 as shown in FIG. 8.

Figure 9:
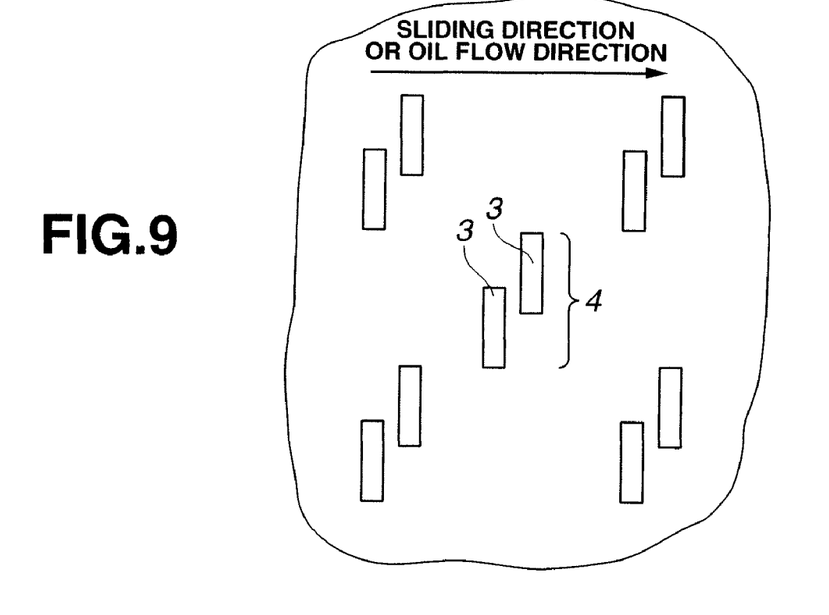
FIG. 9 is a plane view of surface part of a low-friction sliding member according to still another embodiment of the present invention

The adjacent recesses 3 of each texture group 4 have portions aligned with each other in the sliding direction (oil flow direction). Namely, at least the portion of one of the adjacent recesses 3 is located on a front side or rear side of the portion of the other of the adjacent recesses 3 side by side with respect to the sliding direction (oil flow direction). Although the adjacent recesses 3 are entirely aligned with each other in the sliding direction (oil flow direction) as shown in FIG. 1 in the present embodiment, the adjacent recesses 3 may be partially displaced from each other in a direction perpendicular to the sliding direction (oil flow direction) as shown in FIG. 9.

The distance between the texture groups 4 is larger than the distance between the adjacent recesses 3. Further, the texture groups 4 are uniformly distributed over the sliding surface 2 of the sliding member 1, for example, in a staggered arrangement.

Figure 10:
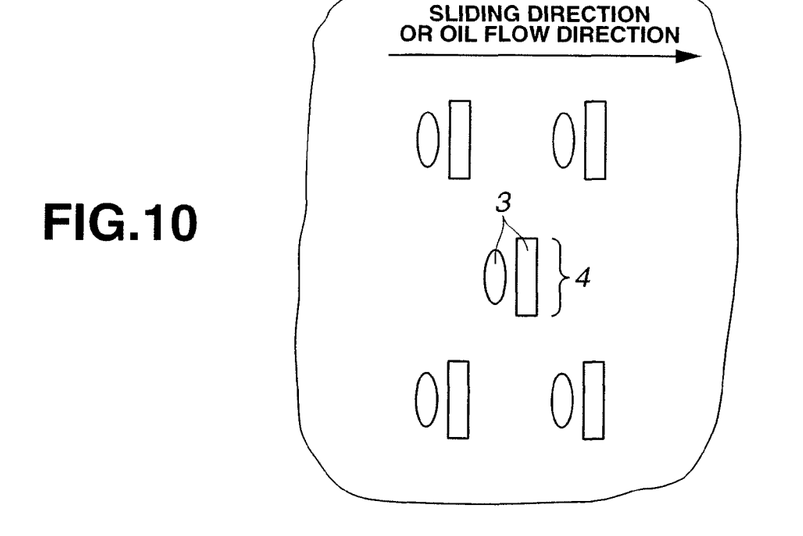
FIG. 10 is a plane view of surface part of a low-friction sliding member according to yet another embodiment of the present invention

The recesses 3 have an elongated shape in the direction perpendicular to the sliding direction (oil flow direction), for example, a rectangular shape. At least one of the adjacent recesses 3 may have any shape other than the rectangular shape, for example, an oval shape as shown in FIG. 10.

Figure 2:
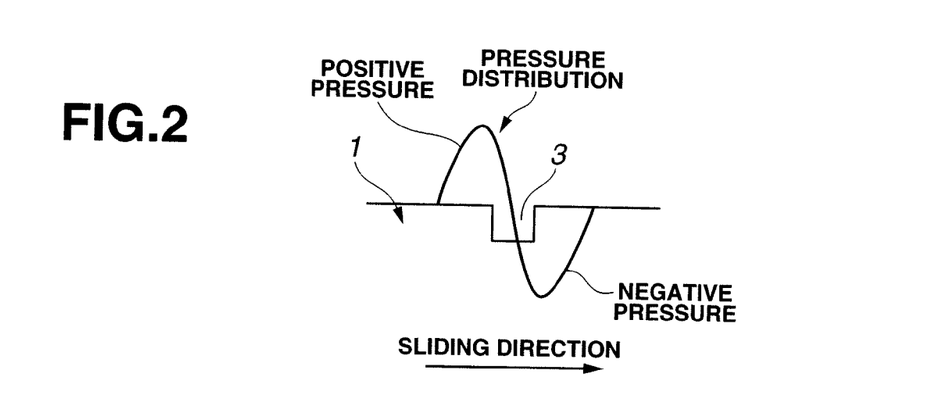
FIG. 2 is an explanation diagram showing a kinetic pressure distribution over one recess in the low-friction sliding member.
Figure 3:
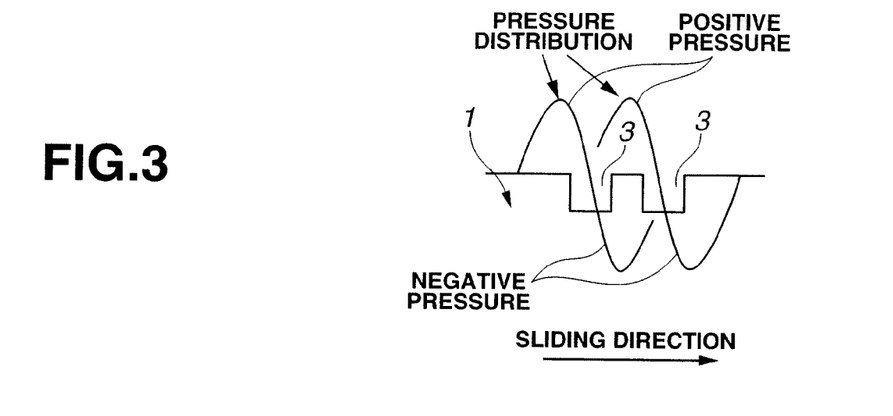
FIG. 3 is an explanation diagram showing a kinetic pressure distribution over adjacent recesses in the low-friction sliding member.

Under the kinetic pressure effect, the kinetic pressure distribution of the lubricating oil over one recess 3 exhibits a positive pressure on a rear side of the recess 3 in the sliding direction (oil flow direction) so as to exert a force that causes an increase in oil film thickness but exhibits a negative pressure on a front side of the recess in the sliding direction (oil flow direction) so as to exert a force that causes a decrease in oil film thickness as shown in FIG. 2. This results in increase in friction.

In the present embodiment, two recesses 3 are adjacently formed in the low-friction sliding member 1 with at least the portions of the recesses 3 aligned to each other in the sliding direction (oil flow direction) so that the negative pressure of the recess 3 on the rear side in the sidling direction (oil flow direction) interferes with and gets reduced by the positive pressure of the recess 3 on the front side in the sidling direction (oil flow direction). This makes it possible to enhance the total kinetic pressure effect and cause increase in oil film thickness for more efficient friction reduction on the low-friction sliding member 1. In the case of three or more recesses 3 formed in one texture group 4, the adjacent recesses 3 can produce the same effect by which the negative pressure of the rear recess 3 gets reduced by the positive pressure of the front recess 3.

It is preferable that the ratio R (X/Y) of the distance X between the adjacent recesses 3 in the sliding direction to the length Y of the recesses 3 in the sliding direction is in the range of 0.25 to 0.5. When the ratio R is less than 0.25, the recesses 3 are located too close to each other and thus merely produce the same effect as one recess. When the ratio R exceeds 5, the recesses 3 are located too apart from each other, fails to cause sufficient kinetic pressure interference due to a displacement between the positive pressure from the front recess 3 and the negative pressure from the rear recess 3 and thus cannot obtain a sufficient friction reduction effect. It is particularly preferable that the ratio R is in the range of 0.5 to 2. When the ratio R ranges from 0.5 to 2, the recesses 3 can cause sufficient kinetic pressure interference so as to increase the oil film thickness to a sufficient degree and thus produce a greater friction reduction effect.

It is also preferable that the shorter length Y of the recesses 3 (in the sliding direction) is in the range of 50 to 150 μm and the longer length L of the recesses 3 (in the direction perpendicular to the sliding direction) is twice to ten times as long as the shorter length Y of the recesses 3. When the shorter length Y of the recesses 3 is less than 50 μm, the lubricant oil does not sufficiently flow into such fine recesses 3 so that the recesses 3 fail to produce a sufficient kinetic pressure effect. When the shorter length Y of the recesses 3 exceeds 150 μm, the recesses 3 are likely to cause metal contact due to a deterioration in load capacity. Further, the kinetic oil pressure effect of the recesses 3 can be produced properly so as to cause sufficient increase in oil film thickness for friction reduction when the recesses 3 are elongated in shape.

It is preferable that the area percentage of the recesses 3 in the sliding surface 2 is in the range of 0.5 to 10%. When the area percentage of the recesses 3 is less than 0.5%, the kinetic pressure effect and oil trap effect of the recesses 3 cannot be produced properly so that the recesses 3 fail to provide sufficient friction reduction. When the area percentage of the recesses 3 exceeds 10%, by contrast, the recesses 3 are likely to cause metal contact due to a deterioration in load capacity and thus fail to provide sufficient friction reduction.

It is further preferable that the recesses 3 satisfy a ratio h/D of 0.04 to 5 where D is the maximum depth of the recesses 3 and h is the viscous fluid thickness during sliding. When the ratio h/D between the depth D of the recesses 3 and the viscous fluid thickness during sliding is less than 0.4, the recesses 3 are likely to cause metal contact due to a deterioration in load capacity and thus fail to provide sufficient friction reduction. When the ratio h/D between the depth D of the recesses 3 and the viscous fluid thickness during sliding exceeds 5, the kinetic pressure effect and oil trap effect of the recesses 3 cannot be produced properly so that the recesses 3 fail to provide sufficient friction reduction.

EXAMPLES

The present invention will be described in more detail with reference to the following examples. It should be however noted that the following examples are only illustrative and are not intended to limit the invention thereto.

Example 1

Figure 5A:
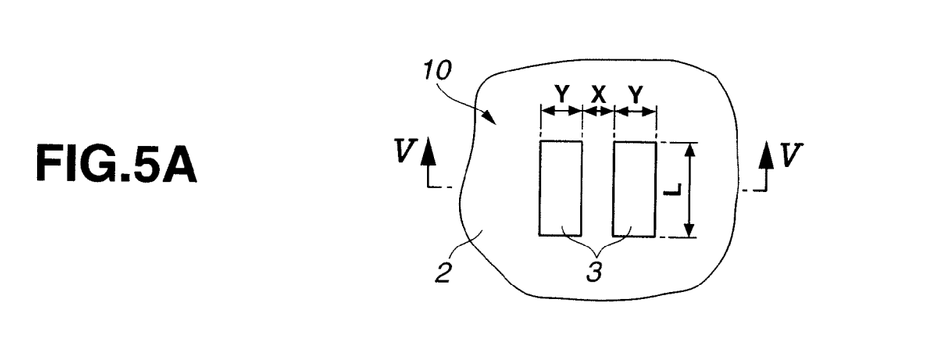
FIG. 5A is a plane view of surface part of a test sample according to Examples 1 to 3 and Comparative Example 2.
Figure 5B:
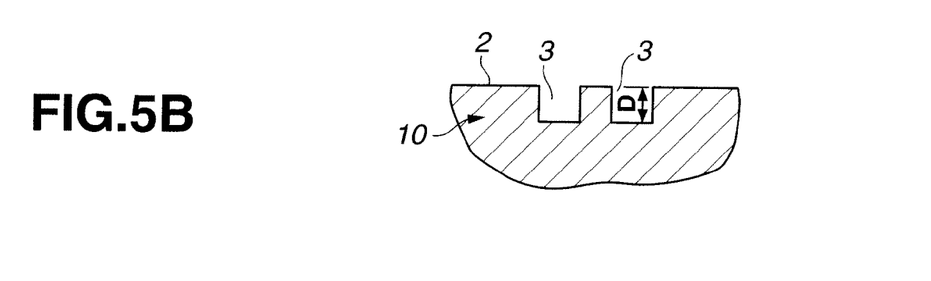
FIG. 5B is a section view of the test sample when taken along a line V-V of FIG. 5A.

A sliding member 1 having a sliding surface 2 with a staggered arrangement of texture groups 4, each of which consisting of two rectangular recesses 3 elongated in the direction perpendicular to the sliding direction as shown in FIGS. 5A and 5B, was produced as a test sample 10 by subjecting a flat plate of steel to component rolling. The shorter length Y of the recesses 3 (in the sliding direction), the longer length L of the recesses 3 (in the direction perpendicular to the sliding direction), the depth D of the recesses 3 and the distance X between the recesses 3 were adjusted to 80 μm, 320 μm, 3 μm and 40 μm (X/Y=0.5), respectively. Further, the distance between the texture groups 4 was made sufficiently larger than the distance X between the recesses 3 so as to adjust the area percentage of the recesses 3 in the sliding surface 2 to 5%.

Example 2

A test sample 10 was produced in the same manner as in Example 1 except that the distance X between the recesses 3 was 80 μm (X/Y=1).

Example 3

A test sample 10 was produced in the same manner as in Example 1 except that the distance X between the recesses 3 was 120 μm (X/Y=1.5).

Comparative Example 1

Figure 6A:
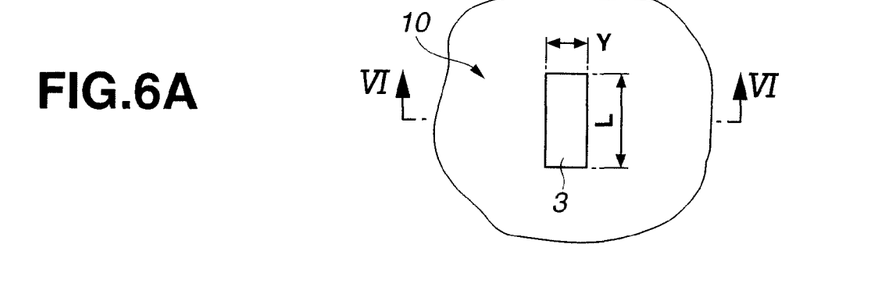
FIG. 6A is a plane view of surface part of a test sample according to Comparative Example 1.
Figure 6B:
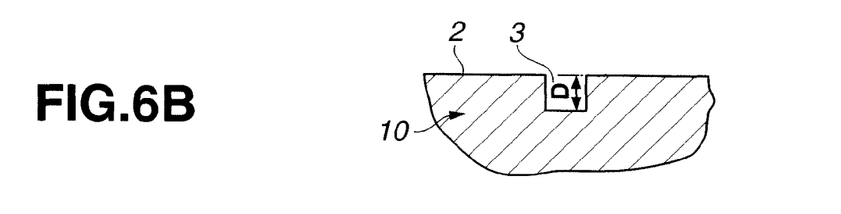
FIG. 6B is a section view of the test sample when taken along a line VI-VI of FIG. 6A.

A test sample 10 was produced in the same manner as in Example 1 except that each texture group 4 had one recess 3 as shown in FIGS. 6A and 6B.

Comparative Example 2

A test sample 10 was produced in the same manner as in Example 1 except that the distance X between the recesses 3 was 820 μm (X/Y=10.5).

The dimensions of the test samples 10 of Examples 1-3 and Comparative Examples 1-2 are indicated in TABLE 2.

Figure 4:
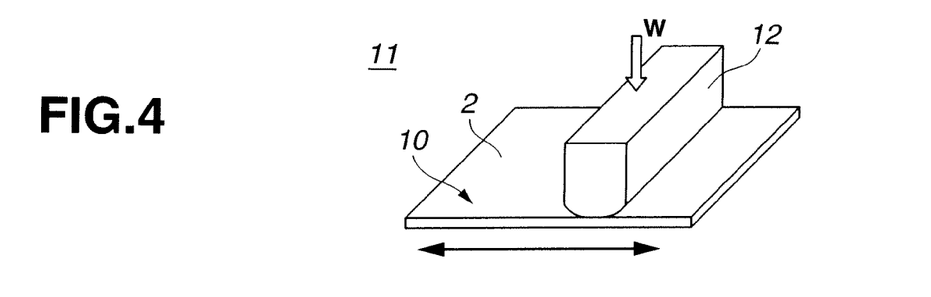
FIG. 4 is a schematic view of a reciprocating sliding test device.

Each of the test samples 10 of Examples 1-3 and Comparative Examples 1-2 was subjected to sliding test using a reciprocating sliding test device 11 shown in FIG. 4. More specifically, the friction coefficient of the test sample 10 was measured by pressing a press member 12 as an opposing sliding member against the sliding surface 2 of the test sample 10 at a constant load W and making a reciprocating movement of the test sample 10 relative to the press member 12 with or without a lubricating oil applied to the sliding surface 2 of the test sample 10. Herein, the press member 12 had no fine recesses.

The test conditions are indicated in TABLE 1. The test results are indicated in TABLE 2 and FIG. 7. In TABLE 2 and FIG. 7, the friction coefficient values ($\mu/\mu_0$) are indicated in normalized form with respect to the friction coefficient value of Comparative Example 1 as 1.

TABLE 1

| | |
|---|---|
| Vertical load W | 25 Kg |
| Sliding stroke | 30 mm |
| Sliding speed | 300 reciprocation/min |
| Oil type | 5W30 |
| Oil temperature | 40° C. in water bath |
| Oil application amount | 0.1 cc applied, or no oil applied |

TABLE 2

| | Number of recesses in one texture group | Recess-to-recess distance X (μm) | Recess shape Y × L (μm) | Recess depth D (μm) |
|---|---|---|---|---|
| Example 1 | 2 | 40 | 80 × 320 | 3 |
| Example 2 | 2 | 80 | 80 × 320 | 3 |
| Example 3 | 2 | 120 | 80 × 320 | 3 |
| Comparative Example 1 | 1 | — | 80 × 320 | 3 |
| Comparative Example 2 | 2 | 820 | 80 × 320 | 3 |

| | Ratio X/Y | Friction coefficient (normalized with respect to Comparative Example 1 as 1) |
|---|---|---|
| Example 1 | 0.5 | 0.67 |
| Example 2 | 1 | 0.60 |
| Example 3 | 1.5 | 0.71 |
| Comparative Example 1 | 0 | 1 |
| Comparative Example 2 | 10.5 | 0.95 |

Figure 7:
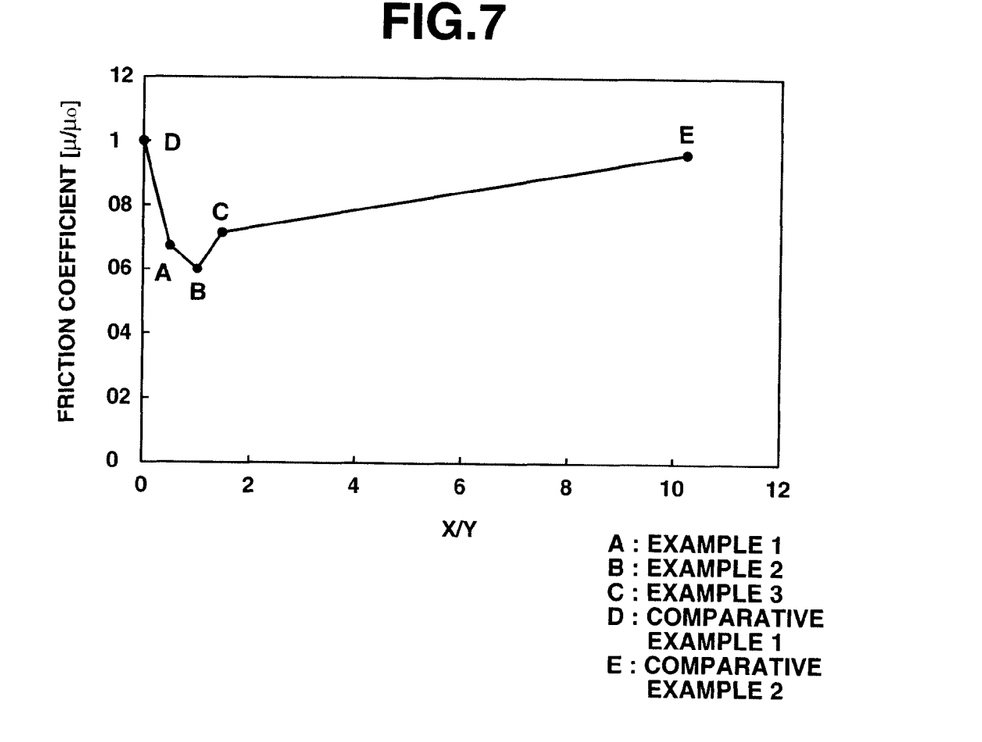
FIG. 7 is a graph showing friction coefficients of the test samples according to Examples 1 to 3 and Comparative Examples 1 and 2.

It has been shown in FIG. 7 that there are optimum values for the length X of the fine recesses 3 in the sliding direction and the distance Y between the fine recesses 3 so as to attain a large friction coefficient reduction effect when the ratio R (X/Y) ranges from 0.25 to 5 and attain a more pronounced friction coefficient reduction effect when the ratio R ranges from 0.5 to 2.

Next, a sliding member production apparatus 20 according to one embodiment of the present invention and a method for producing the low-friction sliding member 1 by the production apparatus 20 will be described below.

Figure 11:
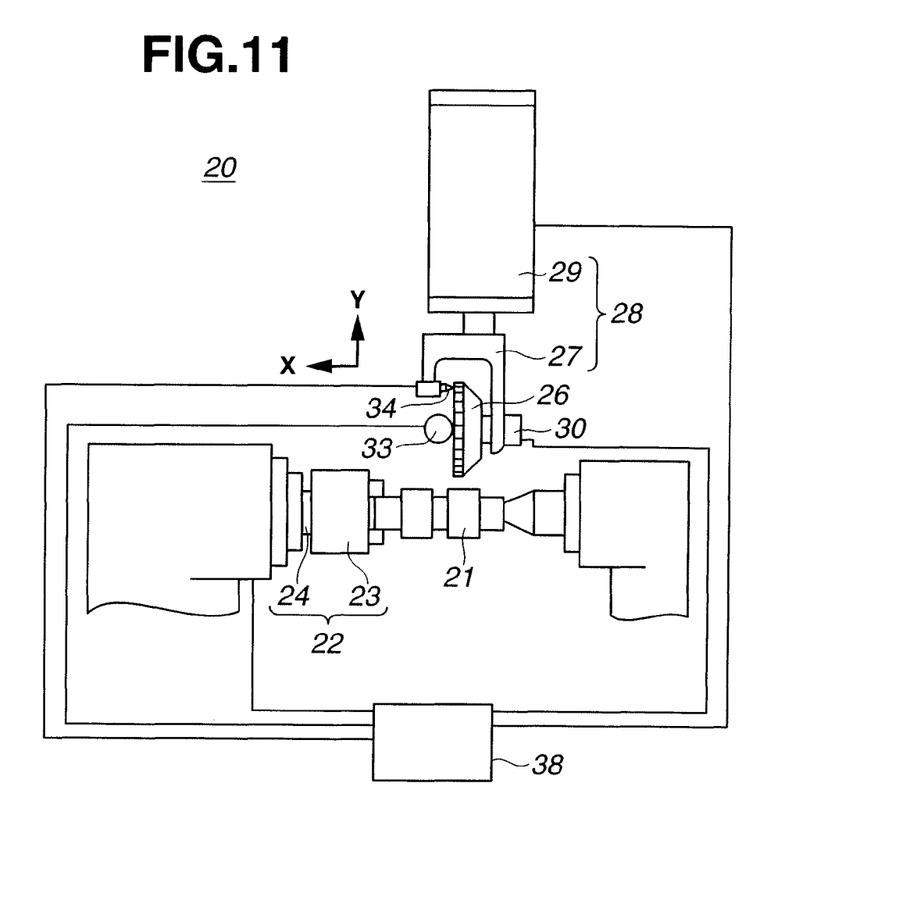
FIG. 11 is a side view of a sliding member production apparatus according to one embodiment of the present invention.
Figure 12:
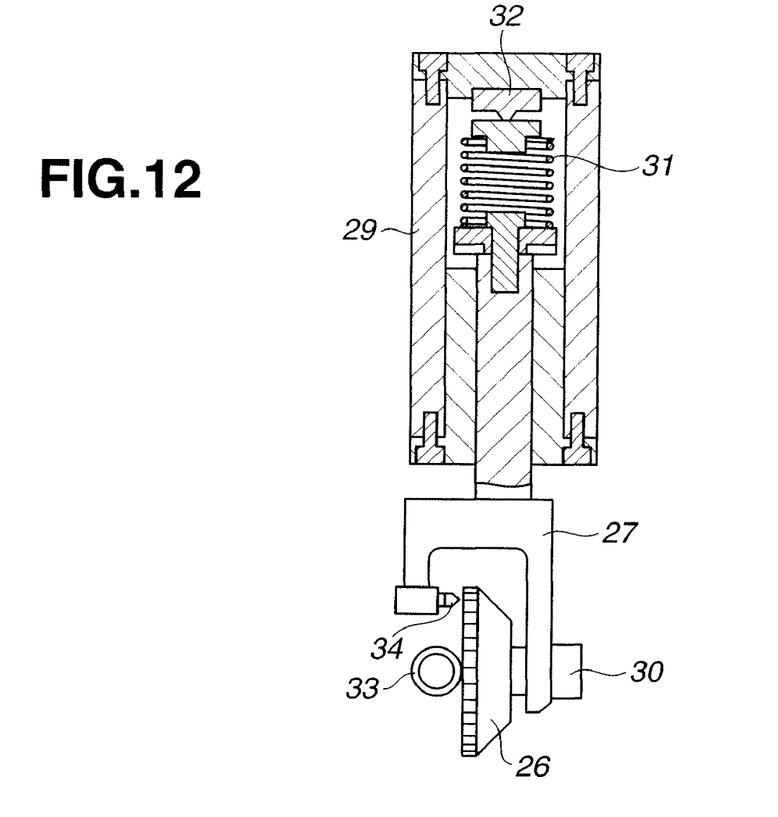
FIG. 12 is a section view of housing inside part of the production apparatus of FIG. 11.
Figure 13:
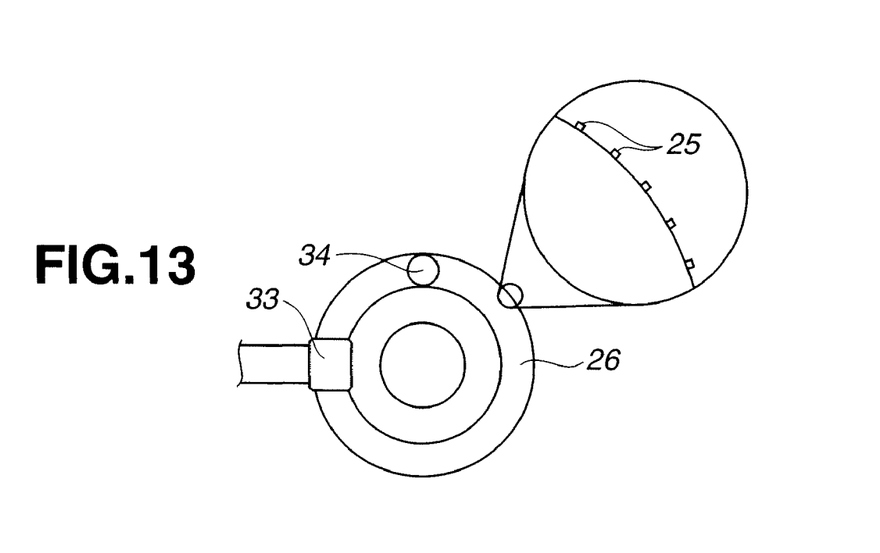
FIG. 13 is a side view of a forming roller of the production apparatus of FIG. 11 when viewed in an axial direction thereof.

The production apparatus 20 is designed to machine a substantially cylindrical workpiece 21 into the sliding member 1 where the plurality of texture groups 4 of adjacent recesses 3 are formed as described above. As shown in FIGS. 11 to 13, the production apparatus 20 includes a workpiece holding unit 22 capable of holding the workpiece 21 in such a manner as to allow rotation of the workpiece 21, a cylindrical forming roller 23 having fine protrusions 25 on an outer peripheral surface thereof and a forming roller holding unit 28 capable of holding the forming roller 23 in such a manner as to allow rotation of the forming roller 23.

The workpiece holding unit 22 has a chucking machine 23 for retaining the workpiece 21 and a main shaft 24 for rotating the retained workpiece 21. The rotation axis of the main shaft 24 is herein in parallel with the rotation axis of the forming roller 26.

The forming roller holding unit 28 has an arm 27 to which the forming roller 26 is rotatably connected and a housing 29 to which the arm 27 is connected so as to move back and forth relative to the workpiece 21.

The protrusions 25 of the forming roller 26 are aligned in a row in the rotation direction as shown in FIG. 13 in the present embodiment, but may alternatively be aligned in multiple rows.

The production apparatus 20 also includes a forming roller detection measurement unit 30 (as forming roller rotational position measurement means) connected to the rotation axis of the forming roller 26 so as to detect a rotational position of the forming roller 26, a load application unit 31 comprised of a coil spring etc. and disposed between the arm 27 and the housing 29 so as to apply a load to the forming roller 26, a load measurement unit 32 disposed between the arm 27 and the housing 29 so as to measure the load and a forming roller drive unit 33 attached to the arm 27 so as to rotate the forming roller 26.

The housing 29 and the workpiece 21 are movable relative to each other by means of an actuator etc. not shown in the drawings in the axial direction of the workpiece 21 or the main shaft 24 (X-axis direction in FIG. 11) and in the direction that brings the forming roller 26 closer to the workpiece 21 (Y-axis direction in FIG. 11). As the forming roller 26, the arm 27, the forming roller detection measurement unit 30, the load application unit 31 and the load measurement unit 32 are fixed to the housing 29, the housing 29 is moved by the actuator etc. together with the forming roller 26, the arm 27, the forming roller detection measurement unit 30, the load application unit 31 and the load measurement unit 32 in the X- and Y-axis directions relative to the workpiece 21. The load is applied by the load application unit 31 upon contraction of the arm 27.

The production apparatus 20 further includes a forming roller positioning unit 34 attached to the arm 27 so as to extend toward the forming roller 26 and a control unit 38 configured to control the forming roller 26 to machine the recesses 3 in an outer peripheral surface of the workpiece 21 under the signals from the forming roller detection measurement unit 30 etc.

The forming roller positioning unit 34 extends to and comes into contact with the forming roller 26 to lock the forming roller 26 in any rotational position.

The control unit 38 receives the signals from the forming roller detection measurement unit 30 etc. and performs operation control of the rotational positions of the forming roller 26 and the workpiece 21 and the axial position of the forming roller 26 (or the relative axial position of the forming roller 26 and the workpiece 21) based on the input signals in such a manner that the adjacent recesses 3 are serially formed by the forming roller 26 in the outer peripheral surface of the workpiece 21.

Using the above production apparatus 2, the low-friction sliding member 1 is produced by the following procedure under the control of the control unit 38.

First, the workpiece 21 is set to the chucking machine 23 as shown in FIG. 11.

The rotational position of the forming roller 26 is next detected by the forming roller detection measurement unit 30. Further, the forming roller 26 is rotated by the forming roller drive unit 33 to a position at which either one of the protrusions 25 on the outer peripheral surface of the forming roller 26 can be pushed perpendicularly into the workpiece 21. The forming roller positioning unit 34 is then operated to lock the forming roller 26 in position upon contact of the tip end of the forming roller positioning unit 34 with the outer periphery of the forming roller 26. In this way, it is possible to perform high-precision positioning of the forming roller 26 by measuring the rotational position of the forming roller 26 and setting the forming roller 26 in position that pushes one of the protrusions 25 on the outer peripheral surface of the forming roller 26 perpendicularly into the workpiece 21.

Figure 14A:
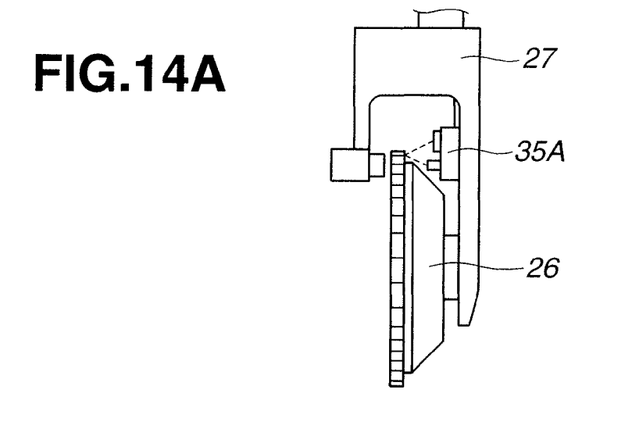
FIG. 14A is a side view of the production apparatus when using a laser measurement unit as forming roller rotational position measurement mean.
Figure 14B:
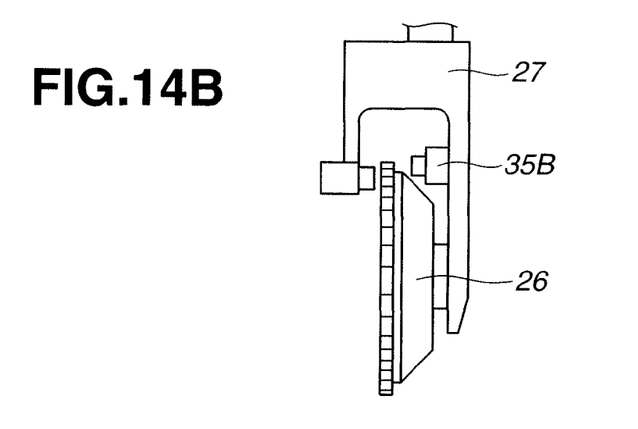
FIG. 14B is a side view of the production apparatus when using an image measurement unit as forming roller rotational position measurement mean.

The forming roller rotational position measurement means is not limited to the forming roller detection measurement unit 30 for measurement of the rotational position of the forming roller 26. As shown in FIG. 14A, a laser measurement unit 35A may alternatively be used as the forming roller rotational position measurement means to enable non-contact detection of the roughness of the outer peripheral surface of the forming roller 26 by a laser and thereby measure the rotational position of the forming roller 26. As shown in FIG. 14B, an image measurement unit 36 may alternatively be used as the forming roller measurement means to take an image picture of the roughness of the outer peripheral surface of the forming roller 26 and measure the rotational position of the forming roller 26 by image processing of the picture. The use of the laser measurement unit 35A or the image measurement unit 35B allows high-speed, high-precision measurement of the rotational position of the forming roller 26.

Figure 15:
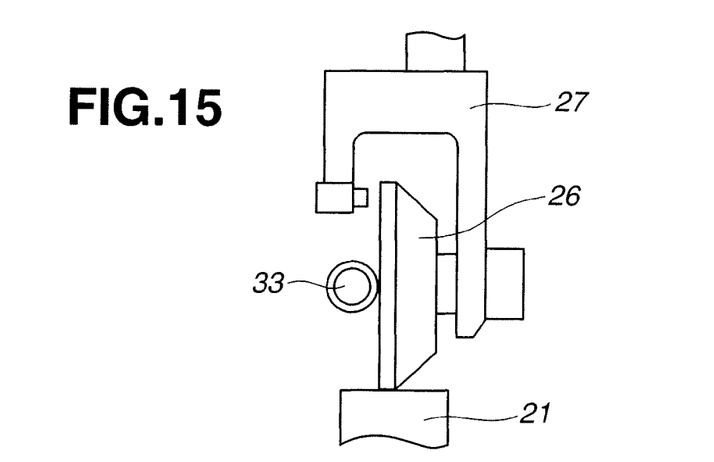
FIG. 15 is a side view of part of the production apparatus under a condition where the forming roller is pressed against a work piece.

After the positioning of the forming roller 26, the forming roller 26 is pressed against the workpiece 21 at a predetermined load as shown in FIG. 15 upon movement of the housing 29 in the Y-axis direction. At this time, the recess 3 can be machined to a desired depth by previously calculating the load for machining the recess 3 and controlling the load based on the calculation result.

Subsequently, the lock of the forming roller 26 is released by contraction of the forming roller positioning unit 34. Further, the workpiece 21 is rotated by rotation of the main shaft 24. One of each adjacent recesses 3 (for example, the recess 3A in FIG. 16) is formed in the outer peripheral surface of the workpiece 21 by moving the forming roller 26 in the X-axis direction every after one rotation of the forming roller 26 or by moving the forming roller 26 in the X-axis direction over the whole of the machining area of the outer peripheral surface of the workpiece 21 while rotating the forming roller 26. By such plastic machining, it is possible to form the recesses 3 at a low cost in a short time while controlling the cross-section profile of the recesses 3.

During the formation of the recesses 3 in the outer peripheral surface of the workpiece 21, the forming roller drive unit 31 is rotated with no load.

Upon completion of the movement of the forming roller 26 in the X-axis direction, the forming roller 26 is detached from the workpiece 21 by upward movement of the housing 29 in the Y-axis direction.

Figure 16:
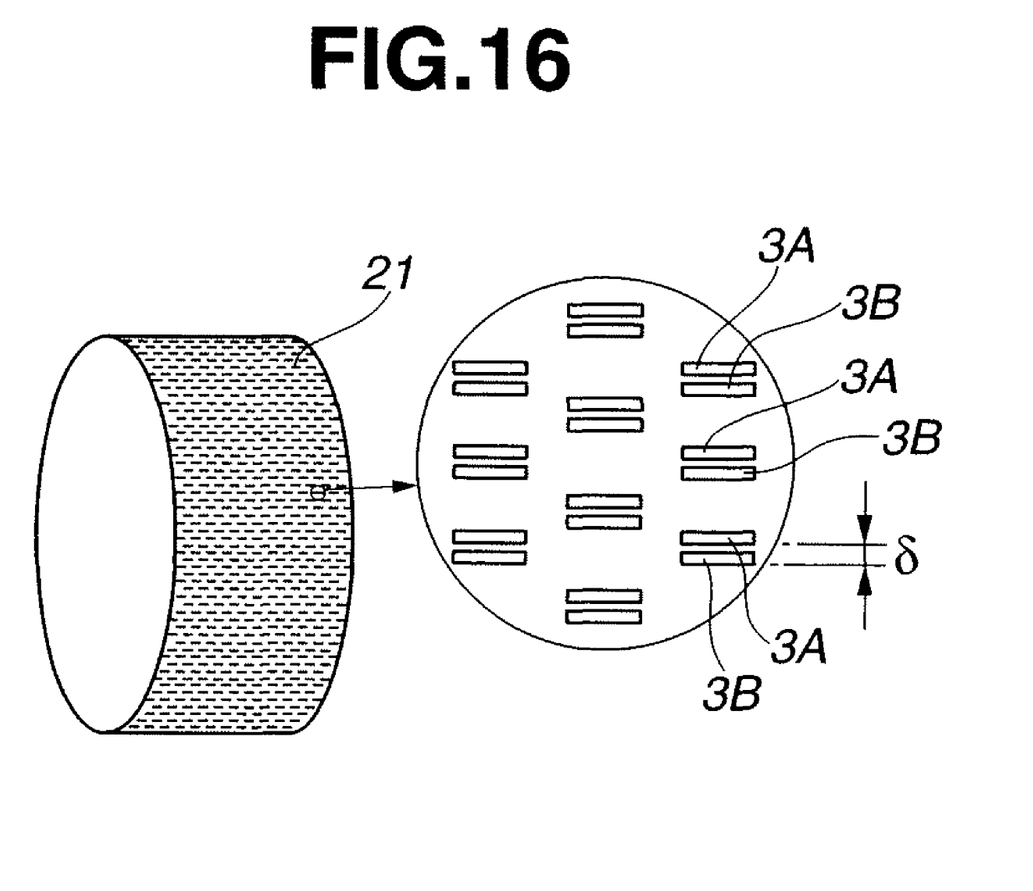
FIG. 16 is a perspective view of an outer peripheral surface of the workpiece.

After that, the rotational position of the forming roller 26 is detected by the forming roller detection measurement unit 30. By the operations of the forming roller drive unit 33 and the forming roller positioning unit 34, the forming roller 26 is rotated to and locked in such position that the protrusion 25 on the outer peripheral surface of the forming roller 26 is pushed perpendicularly into the workpiece 21. At this time, the rotational angle of the forming roller 26 is detected by the forming roller detection measurement unit 30 and the signal of the detected rotational angle is inputted into the control unit 38. As shown in FIG. 16, the control unit 38 calculates the rotational angle of the workpiece 21 at which the other of the adjacent recesses 3 (the recess 3B in FIG. 16) can be formed at a machining interval 6 from the precedingly formed recess 3 (the recess 3A in FIG. 16), and then, causes rotation of the workpiece 21.

Figure 17A:
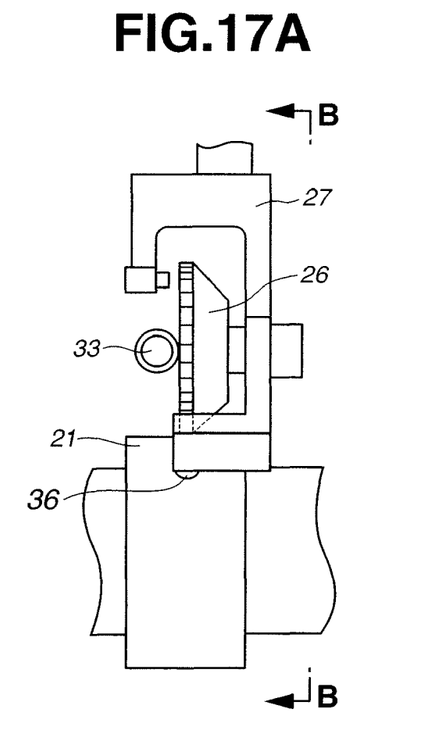
FIG. 17A is a side view of part of a machining shape measurement unit of the production apparatus of FIG. 11.
Figure 17B:
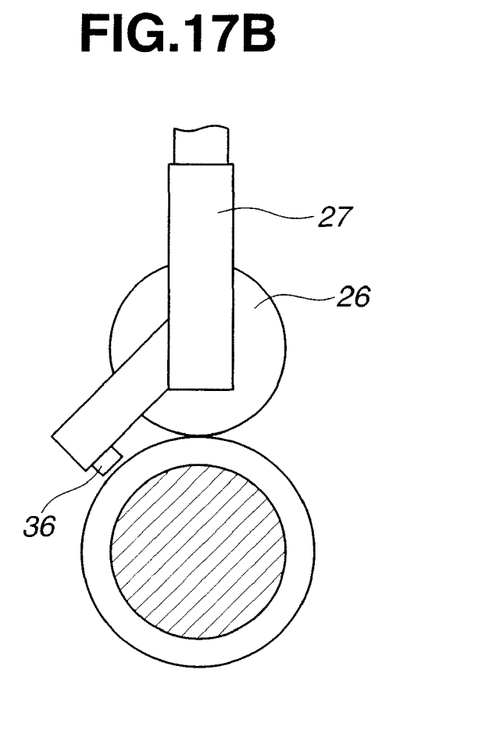
FIG. 17B is a section view of the machining shape measurement unit when taken along a line B-B of FIG. 17A.
Figure 18:
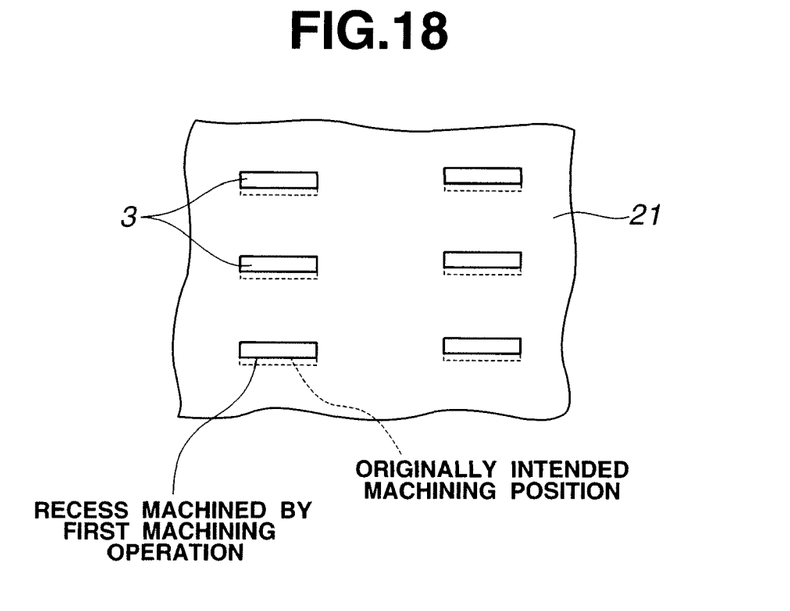
FIG. 18 is a plane view of surface part of the workpiece.

As shown in FIGS. 17A and 17B, a machining shape measurement unit 36 such as a laser measurement means or CCD camera may be provided on the arm 27 to observe the outer peripheral surface of the workpiece 21. When the machining shape measurement unit 36 is provided, the workpiece 21 is rotated by measuring the position of the precedingly machined recess 3A during one rotation of the workpiece 21 and calculating the rotational angle of the workpiece 21 such that the machining position of the recess 3B becomes located at the machining interval 6 from this measured position. It is thus possible to control the machining interval 6 between the adjacent recesses 3 with high precision even when the actual machining position differs from the originally intended machining position as shown in FIG. 18.

In this state, the forming roller 26 is pressed against the workpiece 21 at a predetermined load. The adjacent recesses 3B are then precisely formed in the outer peripheral surface of the workpiece 21 at the interval δ from the precedingly formed recesses 3A by moving the forming roller 26 together with the housing 29 in the X-axis direction while rotating the workpiece 21 in the same manner as mentioned above after contraction of the forming roller positioning unit 34. Three or more recesses 3A can be formed in each texture group 4 by repeating the same machining operations as above.

Figure 23A:
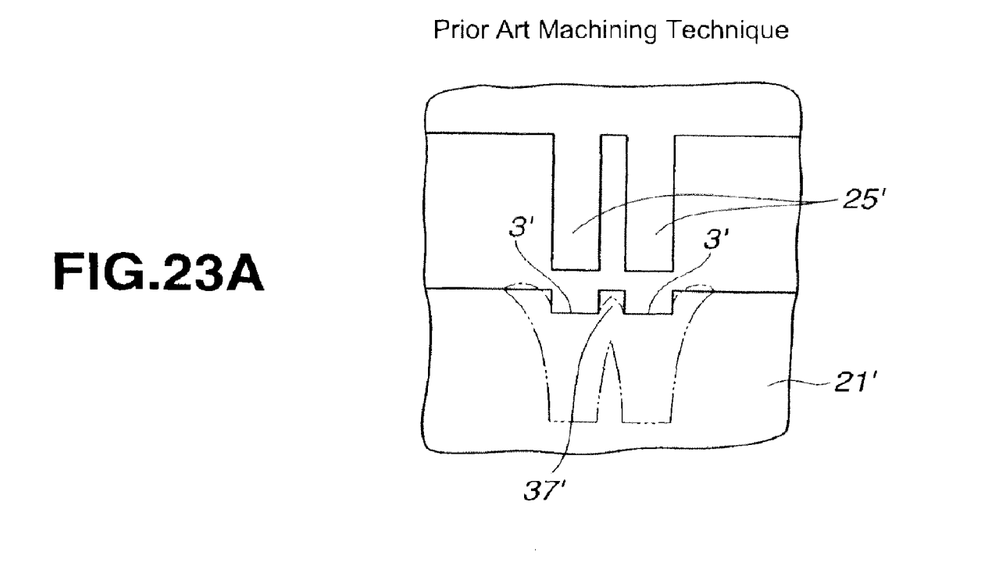
FIG. 23A is a side view of a workpiece machined by a conventional machining technique.
Figure 23B:
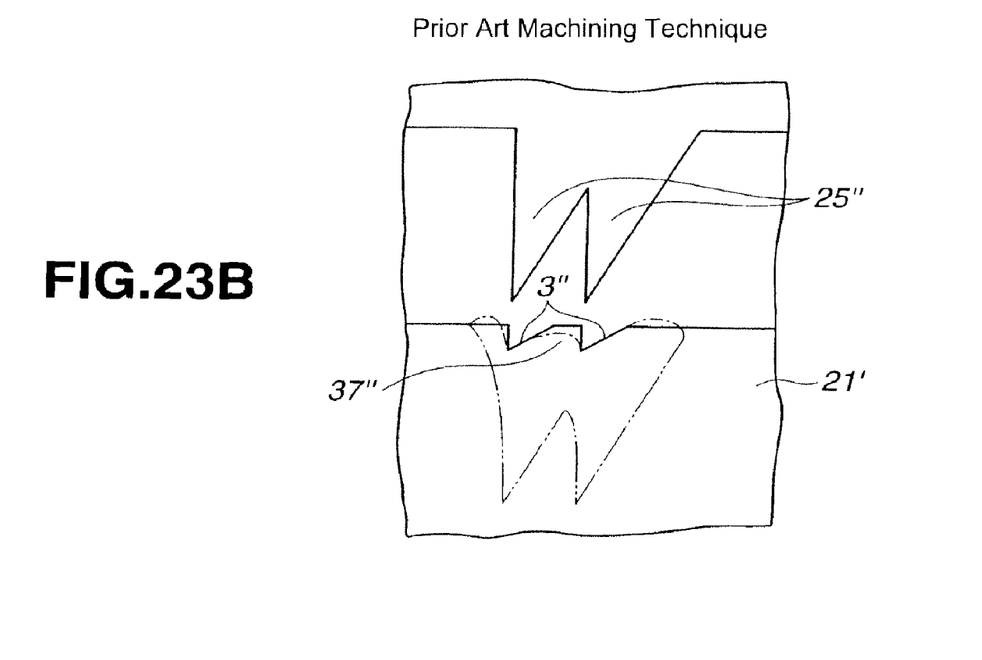
FIG. 23B is a side view of a workpiece machined by a conventional machining technique.

It is preferable to form the adjacent recesses 3 in the workpiece 21 by plastic machining using the high-hardness forming roller 26 with the fine protrusions 25, pressing the forming roller 26 against the workpiece 21 at a substantially constant load and thereby transferring the shape of the protrusions 25 to the workpiece 21. However, there is a possibility that the machining precision of part 37', 37" between the recesses 3', 3" becomes lowered due to material plastic flow when the forming roller protrusions 25', 25" are located adjacently to machine the plurality of recesses 3' of each texture group at a time as shown in FIGS. 23A and 23B. In practice, the workpiece 21' is once deformed into a shape indicated by a double-dashed line and then machined into a shape indicated by a dashed line when the forming roller protrusions 25', 25" are pressed against the workpiece 21' to form the recesses 3', 3" as indicated by a solid line in FIGS. 23A and 23B. The part 37', 37" between the adjacent recesses 3 of the workpiece 21' (corresponding to the part between the protrusions 25', 25") cannot be thus formed into a desired shape by close location of the protrusions 25', 25". In the present invention, by contrast, the adjacent recesses 3 (3A, 3B) are formed separately and serially. It is thus possible to reduce the effect of material plastic flow and machine the adjacent recesses 3 to a more desired shape with a high degree of precision.

A sliding member production apparatus 40 according to another embodiment of the present invention will be next described below.

Figure 19A:
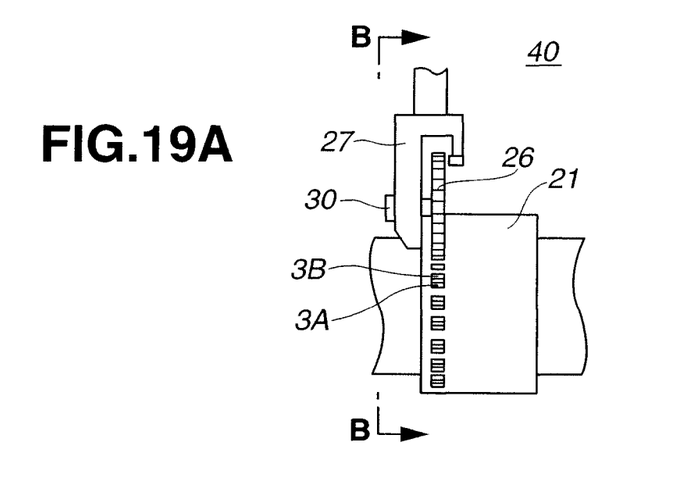
FIG. 19A is a side view of part of a sliding member production apparatus according to another embodiment of the present invention.
Figure 19B:
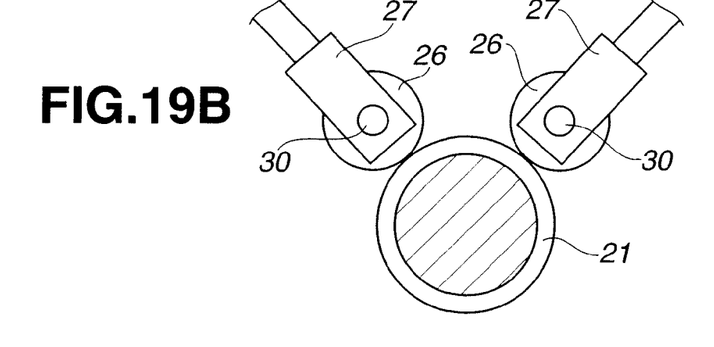
FIG. 19B is a section view of the production apparatus when taken along a line B-B of FIG. 19A.

As shown in FIGS. 19A and 19B, the production apparatus 40 of the present embodiment includes another set of forming roller 26, arm 27, forming roller detection measurement unit 30, load application unit 31, load measurement unit 32 and housing 29 in addition to the production apparatus 20 of the above-described embodiment.

In the production apparatus 40, the adjacent recesses 3A and 3B are formed in the outer peripheral surface of the workpiece 21 by simultaneously pressing two forming rollers 26 against the workpiece 21 and moving the forming rollers 26 in the axial direction of the workpiece 21. Namely, the press positions of these two forming rollers 26 against the workpiece 21 are controlled to the machining positions of the recesses 3A and 3B. It is thus possible to machine the adjacent recesses 3A and 3B to a desired shape with a high degree of precision by forming the recesses 3A (or the recesses 3B) and then, after the effect of material plastic flow ceases, forming the recesses 3B (or the recesses 3A) through the use of the separate forming rollers 26 of the production apparatus 40. It is also possible to perform the recess machining operations in a short time by the plurality of forming rollers 26.

It is feasible to form the recesses 3A by two forming rollers 26 and then form the other recesses 3B by these two forming rollers 26 rather than forming the different recesses 3A and 3B, respectively, by two forming rollers 26.

Figure 20:
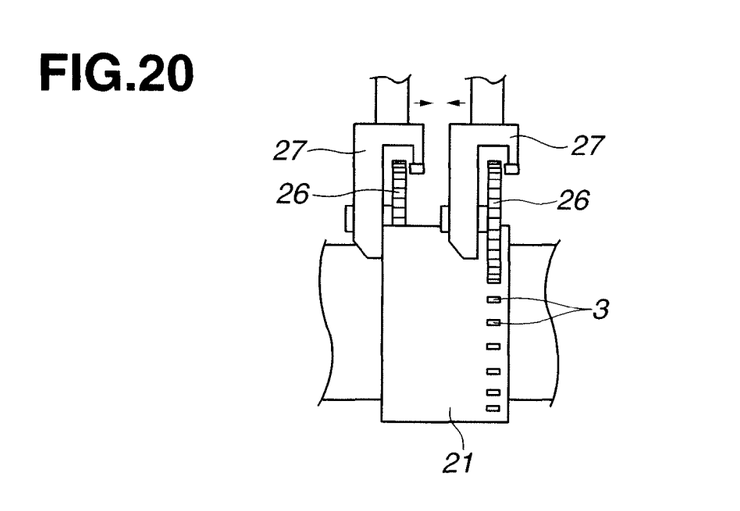
FIG. 20 is a side view of part of a modified version of the production apparatus of FIGS. 19A and 19B.

The movements of two forming rollers 26 in the axial direction of the workpiece 21 can be made in the same direction from the same end as shown in FIGS. 19A and 19B, or can be made in the opposite directions from the opposite ends as shown in FIG. 20.

As shown in FIG. 10, the adjacent fine recesses 3 can be formed in different shapes by varying the shapes of the protrusions 25 on the outer peripheral surfaces of two forming rollers 26, respectively.

An apparatus 50 for production of the low-friction sliding member 1 according to still another embodiment of the present invention will be described below.

Figure 21A:
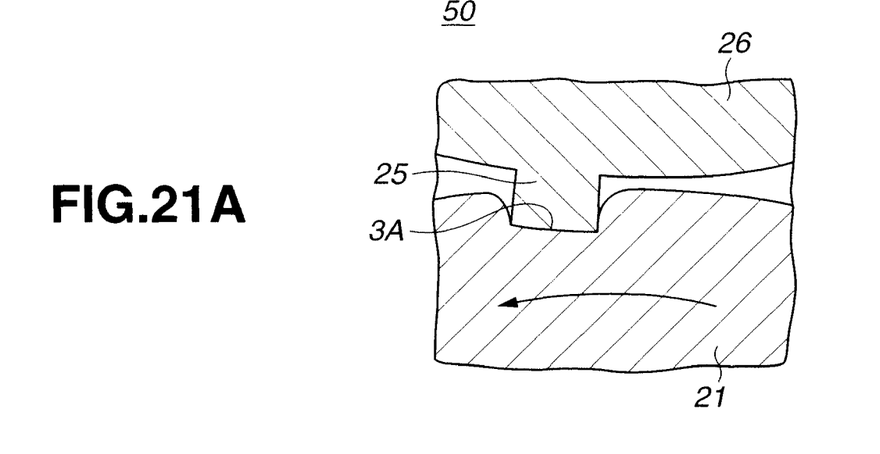
FIG. 21A is a section view of part of a sliding member production apparatus, when machining one of adjacent recesses, according to still another embodiment of the present invention.
Figure 21B:
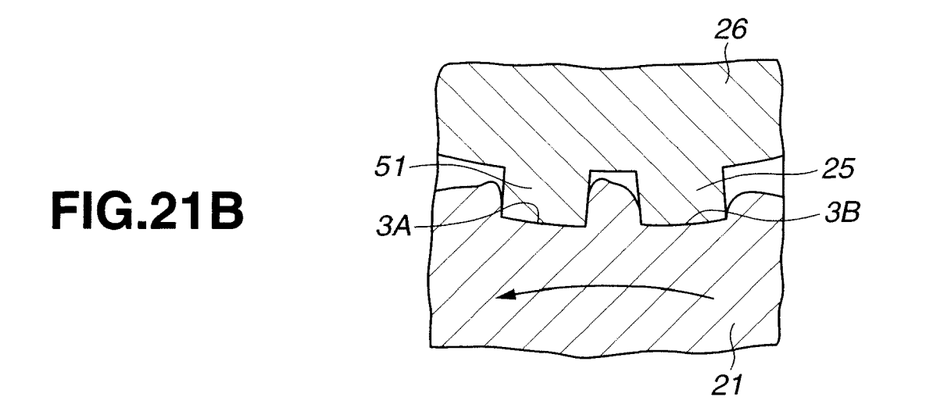
FIG. 21B is a section view of part of the production apparatus of FIG. 21B when machining the other of the adjacent recesses.

The production apparatus 50 of the present embodiment is substantially similar in structure to the production apparatus 40 of the above-described embodiment, except that one of two forming rollers 26 used in the subsequent machining operation to form the recesses 3B (or recesses 3A) among the adjacent recesses 3A and 3B includes a positioning protrusion(s) 51 adjacent to the protrusion(s) 25 on the outer peripheral surface thereof. The protrusion 25 and the positioning protrusion 51 are located corresponding to the positional relationship of two adjacent recesses 3A and 3B. The positioning protrusion 51 is shaped like the protrusion 25 of the forming roller 26 used in the preceding machining operation so as to fit in the precedingly machined recess 3A (or recesses 3B). At the time of machining the recesses 3A (or recesses 3B) by one forming roller 26 and then machining the recesses 3B (or recesses 3A) by the other forming roller 26 with the positioning protrusion 51, it is possible to allow high-precision positioning of the subsequently machined recesses 3B (or recesses 3A) by fitting of the positioning protrusion 51 in the precedingly machined recess 3A (or recess 3B).

Figure 22:
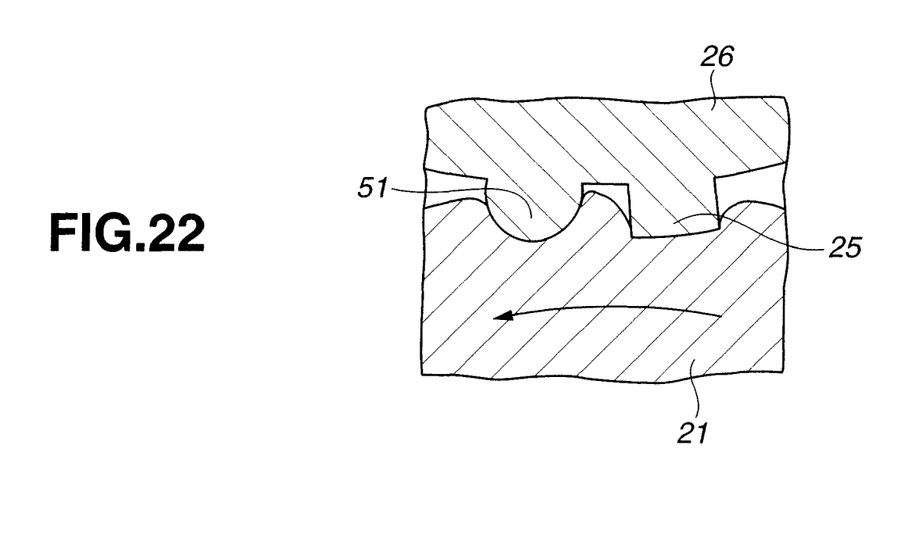
FIG. 22 is a section view of part of a modified version of the production apparatus of FIGS. 21A and 21B.

When the positioning protrusion 51 has a curved surface in spherical form or arc form as shown in FIG. 22, it is further possible to reduce the effect on the shape of the precedingly machined recesses 3A (or recesses 3B) and increase the tool life of the forming roller 26.

Although the present invention has been described with reference to the above specific embodiments of the invention, the present invention is not limited to the above-described embodiments. Various modification and variation of the embodiments described above will occur to those skilled in the art in light of the above teaching. For example, the production apparatus 40, 50 may have three or more forming roller 26 when the low-friction sliding member 1 has three or more recesses 3 in each texture group 4.

The invention claimed is:

1. A low-friction sliding member comprising:
a sliding surface that is slidable relative to an opposing member via an oil, the sliding surface comprising a plurality of texture groups, each of the texture groups comprising at least two adjacent fine recesses arrayed in a sliding direction or oil flow direction such that the recesses have portions aligned with each other in the sliding direction or oil flow direction,
wherein a distance between any adjacent two of the texture groups in the sliding direction or oil flow direction is larger than a distance between the adjacent fine recesses of each of the texture groups in the sliding direction or oil flow direction, and
wherein the texture groups are distributed uniformly over the sliding surface.

2. The low-friction sliding member according to claim 1, wherein the ratio of a distance between the recesses in the sliding or oil flow direction to a length of the recesses in the sliding or oil flow direction ranges from 0.25 to 5.

3. The low-friction sliding member according to claim 2, wherein the ratio of the distance between the recesses in the sliding or oil flow direction to the length of the recesses in the sliding or oil flow direction ranges from 0.5 to 2.

4. The low-friction sliding member according to claim 1, wherein the area percentage of the recesses in the sliding surface ranges from 0.5 to 10%.

5. The low-friction sliding member according to claim 1, wherein the recesses satisfy a ratio h/D of 0.04 to 5 where h is a depth of the recesses and D is a viscous fluid thickness on the sliding surface during the sliding.

6. The low-friction sliding member according to claim 1, wherein the recesses are elongated in a direction perpendicular to the sliding direction or oil flow direction.

7. The low-friction sliding member according to claim 1 wherein the recesses have a shorter length of 50 to 150 μm and a longer length two to ten times as long as the shorter length of the recesses.

8. A low-friction sliding mechanism comprising;
a pair of sliding members having sliding surfaces that are slidable relative to each other via an oil, at least one of the sliding surfaces of the sliding members comprising a plurality of texture groups, each of the texture groups comprising at least two adjacent fine recesses arrayed in a sliding direction or oil flow direction such that the recesses have portions aligned with each other in the sliding direction or oil flow direction,
wherein a distance between any adjacent two of the texture groups in the sliding direction or oil flow direction is larger than a distance between the adjacent fine recesses of each of the texture groups in the sliding direction or oil flow direction, and
wherein the texture groups are distributed uniformly over a sliding member.

9. The low-friction sliding member according to claim 1, wherein the texture groups are distributed uniformly in the sliding direction or oil flow direction.

10. The low-friction sliding member according to claim 1, wherein the texture groups are distributed uniformly in a direction perpendicular to the sliding direction or oil flow direction.

* * * * *